(12) United States Patent
Muller (10) Patent No.: US 6,523,854 B1
(45) Date of Patent: Feb. 25, 2003

(54) VEHICLE PART WITH AN AIRBAG DEVICE AND METHOD FOR PRODUCING A VEHICLE PART OF THIS TYPE

(75) Inventor: Olaf Muller, Rüsselsheim (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/701,071

(22) PCT Filed: May 27, 1999

(86) PCT No.: PCT/DE99/01564

§ 371 (c)(1),
(2), (4) Date: Jan. 20, 2001

(87) PCT Pub. No.: WO99/61288

PCT Pub. Date: Dec. 2, 1999

(30) Foreign Application Priority Data

May 27, 1998 (DE) ..................................... 298 09 554 U
Oct. 27, 1998 (DE) ..................................... 298 19 165 U (51) Int. Cl.⁷ .................................................. B60R 21/20
(52) U.S. Cl. .................................... 280/728.3; 280/732
(58) Field of Search ............................ 280/728.3, 732, 280/728.2

(56) References Cited

U.S. PATENT DOCUMENTS

| | | | | |
|---|---|---|---|---|
| 5,082,310 A | * | 1/1992 | Bauer | 280/728.3 |
| 5,154,444 A | * | 10/1992 | Nelson | 280/732 |
| 5,195,776 A | * | 3/1993 | Sakakida et al. | 280/732 |
| 5,316,334 A | * | 5/1994 | Skidmore | 280/728.3 |
| 5,390,950 A | * | 2/1995 | Barnes et al. | 280/728.3 |
| 5,447,327 A | * | 9/1995 | Jarboe et al. | 280/732 |
| 5,544,912 A | * | 8/1996 | Sommer | 280/728.3 |
| 5,899,488 A | * | 5/1999 | Muller | 280/728.3 |
| 5,901,976 A | * | 5/1999 | Kreuzer et al. | 280/728.3 |
| 6,024,377 A | * | 2/2000 | Lane, Jr. | 280/732 |
| 6,161,864 A | * | 12/2000 | Heilig | 280/728.3 |
| 6,170,859 B1 | * | 1/2001 | Kausch | 280/728.3 |
| 6,315,321 B1 | * | 11/2001 | Lutz | 280/728.3 |
| 6,349,963 B1 | * | 2/2002 | Muller | 280/728.3 |

* cited by examiner

*Primary Examiner*—Brian L. Johnson
*Assistant Examiner*—Christopher Bottorf
(74) *Attorney, Agent, or Firm*—Martin Fleit; Paul D. Bianco; Flet Kain Gibbons Gutman & Bongini (57) ABSTRACT

A vehicle part with an airbag device and a support. A cover is arranged flush with an opening in the support that is brought into a retracted position within the support when the airbag is triggered. A covering layer is positioned over the cover. The cover and the covering layer have mutually cooperating interlocking parts that assure that when the airbag is trigged, the covering layer and the cover are retracted within the support. A method for effecting the interlocking of the cover and the covering layer, and a method for providing a weakening of the covering layer along a predetermined line.

21 Claims, 6 Drawing Sheets

VEHICLE PART WITH AN AIRBAG DEVICE AND METHOD FOR PRODUCING A VEHICLE PART OF THIS TYPE

BACKGROUND OF THE INVENTION

1. Field of the Invention

The invention relates to a vehicle part with an airbag device as well as a method of production for such a vehicle part.

2. Prior Art

Modern vehicles comprise dashboards and steering wheels into which airbags are integrated. When a crash occurs, the airbag of an airbag device deploys out of ist location, either a dashboard or a steering wheel. During this event, a covering, such as for example, a lid that covers the airbag, opens before or during the deployment of the airbag.

For example, in the former German patent applications DE 197 25 878.1 and DE 157 33 895.8, which originated with the present inventor, an airbag device with retracting lid(s) as a covering means is described: Furthermore; German applications DE 197 12 728.7, DE 197 25 878.1, DE 197 33 895,8, DE 298 08 317.5 and DE 298 09 554.8, which originated with the present inventor, generally relate to airbag devices and triggering methods thereof.

Hereby, reference is made to all applications mentioned above, and especially regarding all features which refer to the retractable lid(s) or generally retractable covering means of the airbag device as prior known technology.

In practice, an airbag device as indicated in German patent applications DE 197 26 878.1 and DE 197 33 896.8 is integrated in a vehicle part with a support, wherein the covering means coupled to said airbag device are arranged at least essentially flush in an opening in said support in a rest position before a triggering of said airbag device, and the covering means being brought in the direction away from the passenger into a retracted position at least essentially behind or into the vehicle part by a mechanism resulting from a triggering of the airbag device, and wherein said covering means have a common surface layer facing the passenger.

In case of an airbag device with retractable covering means such as, for example, one or two lid(s) in a normal case, the covering means can be retracted because they are tightly connected with the retracting mechanism. In this case, however, there is the risk that a tear off may occur between the surface layer, which can also be called outer skin, and the covering means. If there is foam material between the surface layer on the one hand and the support and the covering means on the other hand, as it is often the case, the connection between the outer skin and the foam material and/or between the foam material and the covering means can tear off. Then this can result in particles of the outer skin and/or given the case of the foam material being pushed outside towards the passenger by the airbag during its deployment, and a flying about of loose particles is not excluded. This causes a danger to the passenger(s).

SUMMARY OF THE INVENTION

Therefore, it is the object to provide a vehicle part with an airbag device as well as a method for production of such a vehicle part to guarantee an increased level of safety in the case of the triggering of the airbag device.

With such a vehicle part with an airbag device and a support to said airbag device covering means are coupled which are arranged at least essentially flush within an opening in said support in a rest position before a triggering of said airbag device, and are brought into a retracted position at least essentially behind or into said vehicle part in the direction away from a passenger by means of a mechanism resulting from a triggering of the airbag device, and said support and said covering means have a common surface layer facing the passenger. Furthermore connection means are provided by means of which said surface layer in the region of said covering means is fixedly connected to said covering means and/or said mechanism, at least adjacent to parts of the periphery of said opening.

By these means with the vehicle part in accordance with the invention opposite to the prior art, as a further improvement it is avoided that by retracting the lids or generally the covering means the latter are being separated from the surface layer and particles of the surface and/or a foam material which might possibly be between the surface layer on the one hand and the support and the covering means on the other hand, may be separated and fly about.

The invention can he applied in particular, however, not exclusively, to a driver or steering wheel airbag or a passenger-side airbag with retractable covering means. Thus, the corresponding vehicle parts are the steering wheel or the dashboard of a vehicle, wherein, for example, side, roof or seat linings can also be equipped in an appropriate way to be able to provide airbags in all desired or required places in a vehicle.

According to a preferred further development of the invention, it is provided with the vehicle part that the surface layer is provided with weakenings or thinnings according to the shape of said opening and/or said covering means. Thus an intended and slight tearing off of the surface layer at least around the covering means during the retraction of the covering means and/or the deployment of the airbag is achieved in an advantageous way.

In particular, it is advantageous with a vehicle part according to the invention if said covering means comprise at least two lids, and if preferably furthermore said surface layer is provided with weakenings or thinnings in the area between said lids. Several lids lead to a as quick as and as easy as possible opening which is even more supported by the eased-tear ability of the surface layer between single lids.

It is preferred if weakenings or thinnings of the surface layer are not noticeable on the side facing the passenger, in its condition mounted in the vehicle. Thereby a pleasantly and preciously looking exterior of the surface layer is achieved.

The weakenings or thinnings may include a continuous or intermittent, especially, regular, material thinnings and/or perforations and/or micro perforations in the course of their extension. Thus an optimum tear off behaviour of the surface layer is provided for in an advantageous manner in dependence on the material of the surface layer and its thickness.

In the scope of a preferred embodiment of the invention it is provided that said connection means include webs and/or flaps mounted to or formed at, preferably integrally formed with said surface layer, and connected to said covering means and/or said mechanism. This has the advantage that such connection means can be made without additional parts directly with the manufacture of the surface layer.

Alternatively or additionally, it may be provided with the vehicle part according to the invention that said connection means include fabric material which fixedly is connected to or included within or surrounded by the material of said surface layer, and connected to said covering means and/or said mechanism. Thus a sufficiently permanent and tight connection between the surface layer and the covering means can be achieved in an advantageous way even in dependence on, for example, space or durability requirements.

The above mentioned possibility of embodiment of the invention may be further developed in that the fabric material reaches from said covering means beyond the periphery of said opening of said support, and/or in that, given the case, the fabric material is also at least partly provided in the region of said weakenings or thinnings along the periphery of said opening of said support. In this way, the advantage is achieved that the surface layer in the areas not supported such as, for example, joints between the support and covering means or, given the case, in the areas of the weakenings or thinnings cannot collapse which improves the appearance of the surface being presented to the passengers.

The variants of the invention with a fabric material as at least one component of the connection means may be further developed in that said surface layer includes a cover layer and a base layer, and in that the fabric material is situated within said cover layer or between said cover layer and said base layer. By means of the invention the two-part construction of the surface layer as it is partly used nowadays, is used for a simple and tight connection of the fabric material of the connection means to the surface layer.

According to a further development of the invention in the region of the periphery of the opening separation assisting means may be provided which in case of a movement of said covering means out of their rest position weaken and/or cut said surface layer at least in the regions between said support and said covering means. Thus the tearing off of the surface layer during the retraction of the covering means is furthermore made easier. Such separation assisting means can be arranged in such a way that they do not present a risk for the passenger without a protecting airbag, in case of a passenger's impact on the areas of the vehicle part lying there above. For example, corresponding webs or frames can be provided which in case of an impact of a passenger slip in between the latter and the separation assisting means.

As already mentioned above, in the scope of the present invention, foam material may be included between the surface layer on the one hand and the support and the covering means on the other hand, wherein then said connection means pass through said foam material⁻ between said surface layer on the one hand and said support and said covering means on the other hand. Such a foam material results in a pleasant feeling when touching the surface of a vehicle part equipped in such a way and furthermore, in case of an impact onto the surface layer the foam material also forms an additional absorbing protection layer.

Furthermore, in the scope of the invention in order to achieve the object the latter is based on, a method for producing a vehicle part is provided which includes an airbag device and a support, wherein to said airbag device covering means are coupled which are arranged at least essentially flush within an opening in said support in a rest position before a triggering of said airbag device, and are brought into a retracted position at least essentially behind or into said vehicle part in the direction away from a passenger by means of a mechanism resulting from a triggering of the airbag device, and wherein a common surface layer facing the passenger for said support and said covering means. Furthermore, according to the invention, said surface layer in the region of said covering means is fixedly connected to said covering means and/or said mechanism by means of connection means, at least adjacent to parts of the periphery of said opening.

Also by this method, with the subject according to the present invention it is prevented that parts of the surface layer or outer skin and, given the case, of the foam material can get loose and fly about in case of the retraction of the covering means. This results in an increased safety when the airbag device deploys.

Therefore, the present invention especially also refers to techniques of connecting an outer skin with covering means in case of an airbag device with retractable covering means. Certain methods for producing the vehicle part result from the special connections of the outer skin with the lid support.

Although the objects of the invention have been described above with regard to specific structures and methods, variation are possible. The surface layer may be provided with weakenings or thinnings, for example, according to the shape of the opening and/or the covering means. If the covering means comprise at least two lids, the surface layer can be provided with weakenings or thinnings in the region between the lids. These versions can be further developed in the way that said weakenings or thinnings are produced continuously or intermittently, especially regularly, by material thinnings and/or perforations and/or micro perforations in the course of their extension.

Another preferred embodiment of the method for producing a vehicle part in accordance with the invention is that as connection means webs and/or flaps are fixed to or formed at, preferably integrally formed with said surface layer, and are connected to said covering means and/or said mechanism. Additionally or alternatively, it may be provided that said connection means include fabric material which is fixedly connected to or inserted into or sandwiched between the material of said surface layer and connected to said connection means and/or mechanism. In the case of the latter variant the fabric material can he provided reaching from the covering means beyond the periphery of the opening of the support, and/or the fabric material, given the case, can also he provided at least partly in the area of weakenings or thinnings along the periphery of the opening of the support. If the surface layer is made of a cover layer and a base layer, the fabric material can be provided within the cover layer or between the cover layer and the base layer.

According to the method, it can also be provided that in the area of the periphery of the opening separation assisting means are arranged which in case of a movement of the covering means out of their rest position weaken and/or cut the surface layer at least in the regions between the support and the covering means.

Furthermore, in the scope of the method in accordance with the invention, it is also possible to provide foam material between the surface layer on the one hand and the support and the covering means on the other hand, and to foam foam material around the connection means between the surface layer on the one hand and the support and the covering means on the other hand.

BRIEF DESCRIPTION OF THE DRAWINGS

Further preferred and advantageous embodiments of the invention result from the correspondingly depending claims and their combinations as well as the illustrations and descriptions of the embodiment examples in the drawings or the following specification part.

In the following, the invention is explained in more detail by embodiment examples with reference to the drawings in which.

DETAILED DESCRIPTION OF PREFERRED EMBODIMENTS

In the individual figures of the drawing identical or similar parts or assemblies are given the same reference symbols. In this way, such parts or assemblies and their effects and functions in relation to individual illustrations will become clear to the expert even then if there is no discussion in detail in the following. Furthermore, specifications in the following text can even be associated by the illustrations in the drawing, if there are no extra reference symbols used or included. Furthermore, the comparing view of the individual figures as well as the detailed view of each individual figure itself allows due to their illustration a clear reference of parts and features even if they are not characterised in each single or the corresponding figure.

Figure 1:
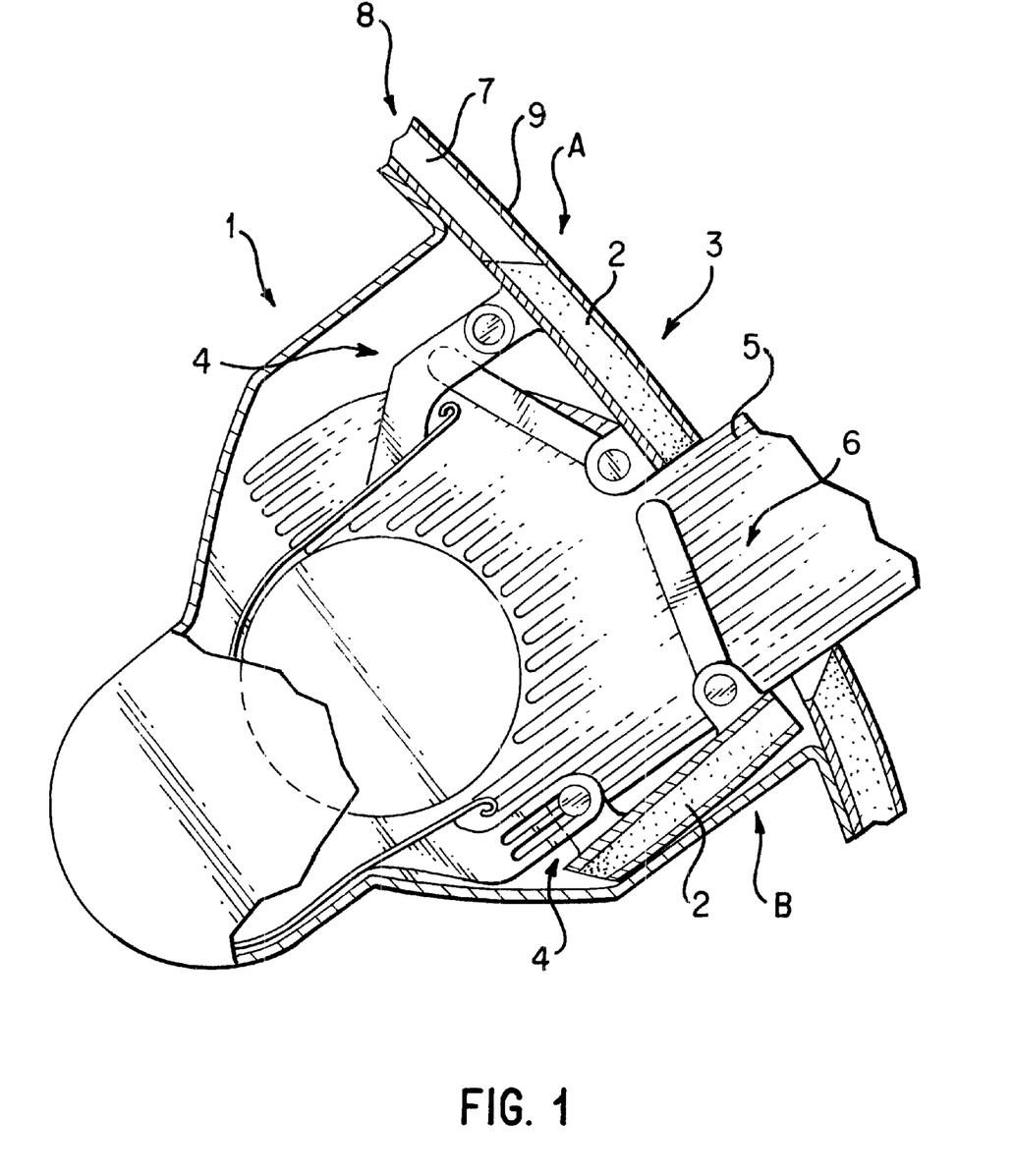
FIG. 1 shows a principal diagram of retracting airbag lid in a cross-section.

FIG. 1 shows a principal diagram of an airbag device 1 with retracting lid(s) 2 as covering means 3 in a cross section analogous to the technical teaching of the German patent applications DE 197 2G 878.1 and DE 197 33 896.8, which are completely included herein by the reference above in the introduction of this specification with relation to this and further embodiments of an airbag device 1 with retractable covering means 3.

The covering means 3 are connected to a mechanism 4 by which they are brought from a rest position A (see top left in FIG. 1) into a retracted position B (see bottom right in FIG. 1) if the airbag device 1 is triggered. If the covering means 3 are in the retracted position B an airbag 5 can freely emerge from an opening 6 in the support 7 of the vehicle part 8 equipped with the airbag device 1, and unfold to protect a passenger (not shown). The support 7 and the covering means 3 are covered with a surface layer 9.

The invention is based on the idea of sufficiently tightly connecting surface layer or outer skin 9 on the one hand and the support 7 and the covering means 3 on the other hand.

Figure 2:
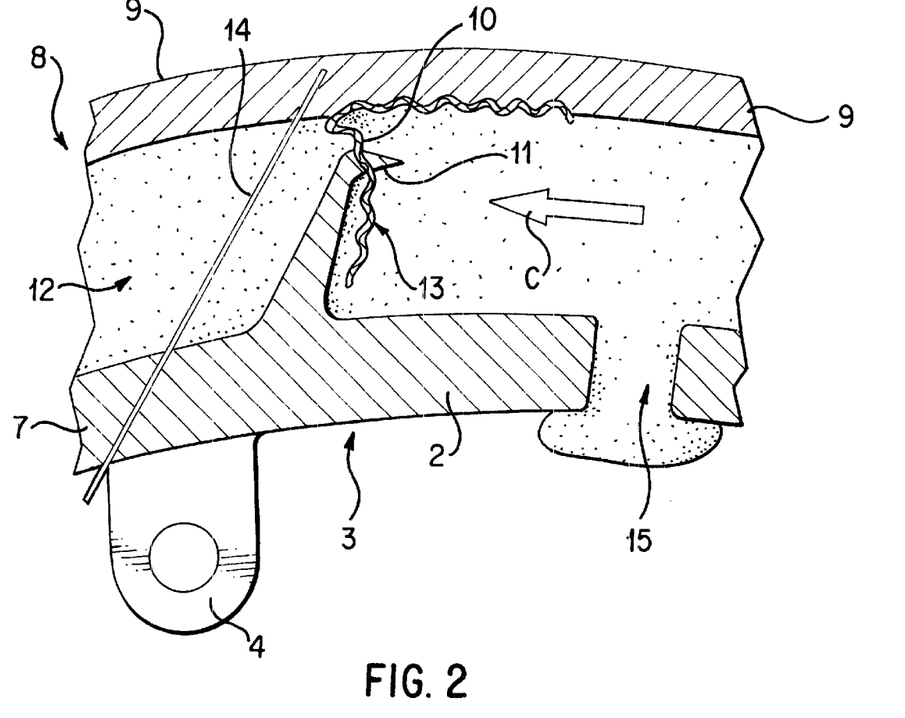
FIG. 2 schematically illustrates partially in section a first embodiment example of a vehicle part according to the present invention.

A first embodiment example for this is shown in FIG. 2 in which a first embodiment example of a vehicle part according 24 to the present invention is schematically illustrated partly in a section. With regard to method and production techniques there is pressed in with a casting stamp (not shown) into the surface layer or casting skin 9 being in still liquid condition, in the area of the covering means 3 near the periphery of the opening 6 a piece of fabric 10 which then is baked together with the surface layer or the skin 9. Catching hooks 11 are formed, such as, for example, injection moulded on or to the lids 2, which can also be called inner supports so tar. If there is applied foam material 12 to the surface layer 9 on the one hand and the lids 2 and the support 7 on the other hand in the foam flow direction (arrow C), the fabric 10 is taken along and flushed against the catching hook 11, is got, caught on the latter and hooks thereto. After the hardening of the foam material 12 the surface layer 9 is tightly connected with the lid 2 by the fabric material 10 which thus forms connection means 13.

Of course, there are also plain mechanical fixings of the fabric 10 possible, by putting it through cavities (not shown) within the lid 2 before the foaming and fixing it mechanically. The fabric 10 can also be a carted grating or something similar.

In FIG. 2 a laser or blade cut 14 is also illustrated by means of which the support 7 and the lid 2 are separated in desired and required, manner after they had been produced integrally so that the lid 2 can be retracted from the opening 6 by means of the mechanism 4 (compare FIG. 1). Furthermore, a foam entrance 15 is show by which the foam material 12 in liquid condition is applied between the surface layer 9 on the one hand and the lids 2 and the support 7 on the other hand.

Figure 3:
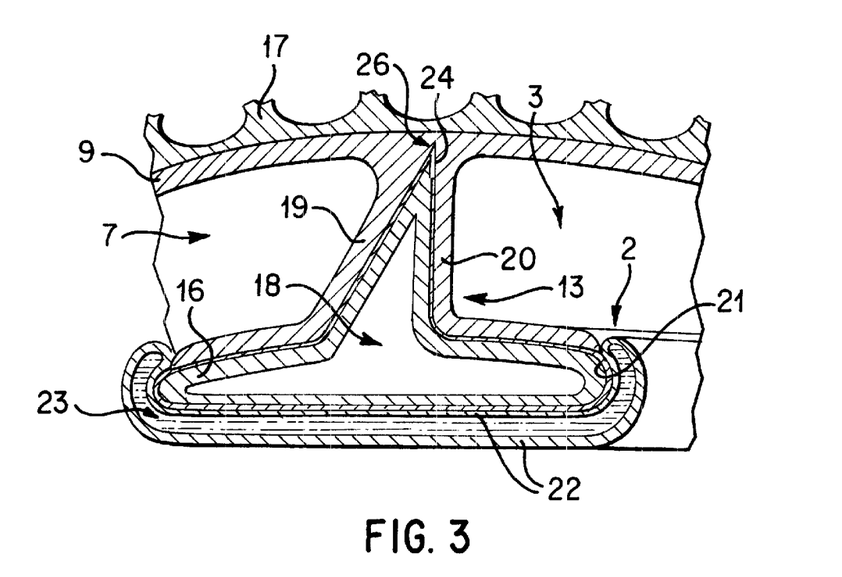
FIG. 3 illustrates a condition in an embodiment of a manufacturing method for a second embodiment example of a vehicle part according to the present invention in a schematic sectional illustration.

FIG. 3 illustrates a condition in the embodiment of a manufacturing method for a second embodiment example of a vehicle part according to the present invention in a schematic sectional view. Here an especially produced tool 16 for the surface layer or the cast skin 9 of the dashboard embodying the vehicle part 8 in the present case, is shown in the critical section of the transfer of the support 7 of the dashboard to the lid 2 of the covering means 3. In a galvanocast 17 the material of the surface layer or the cast skin 9 is inserted in an usual manner. One special feature of the present invention is the movable tool 16 which can also be called an insert and includes a channel 18 on which cast skin flaps 19 and 20 result rib like by heating and cooling the insert or the tool 16 as hollow body in a corresponding way 30 during the process of gelling of the cast skin folds 19 and 20. In the areas without gelling the tool 16 is thermally isolated by an intermediate layer 21 and covered there above by a channel 22 which guides cooling agent 23.

This movable tool 16 is provided with an inserted blade 24 at the position on which in case of an accident the surface layer or cast skin 9 separates upon the triggering of the airbag device 1. An alternative is that by means of the blade 24 an exact remaining thickness of the surface layer or cast skin 9 is produced in that during the process the tool or the insert 16 is driven against the galvanocast 17. Afterwards from this "zero position" the insert 16 is exactly, for example, laser controlled, driven back to a gap width corresponding to the remaining thickness of, for example, one or a few tenth of millimeters. Thus a weakening or thinning 26 in the surface layer or cast skin 9 is produced by means of the blade 24. The remaining thickness of the surface layer or cast skin 9 at the weakenings or thinnings 26 is determined in such a way that on the one hand the durability of the surface layer or cast skin 9 is sufficiently strong and on the other hand the tearing abilities in case of a triggering of the airbag device as a consequence of an accident is sufficiently good. The movement of the blade 24 can take place before, during or after the process of gelling of the surface layer 9.

Figure 4A:
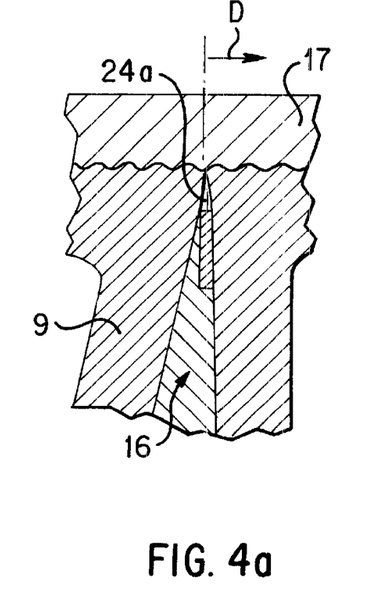
FIGS. 4a and 4b show two by 90° different schematic sectional views of a condition in another embodiment of a manufacturing method for a third embodiment example of a vehicle part according to the present invention.
Figure 4B:
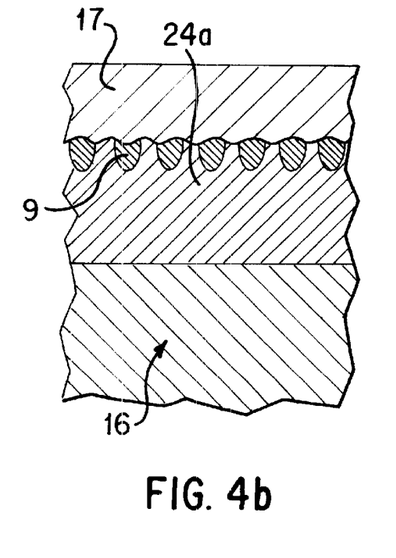

FIGS. 4a and 4b show two by 90° different schematic sectional views of a condition in another embodiment of a manufacturing method for a third embodiment example of a vehicle part according to the present invention. The view of FIG. 4b results in the line of vision of the arrow D in FIG. 4b. In this embodiment example the tool 16 comprises a "perforation cutter" 24a which is pressed against the galvanocast 17 and then bit by bit allows the through flow of the material of the surface layer 9 and thereby perforates the surface layer 9 line-shaped in order to generate a corresponding weakening or thinning 26.

Figure 5:
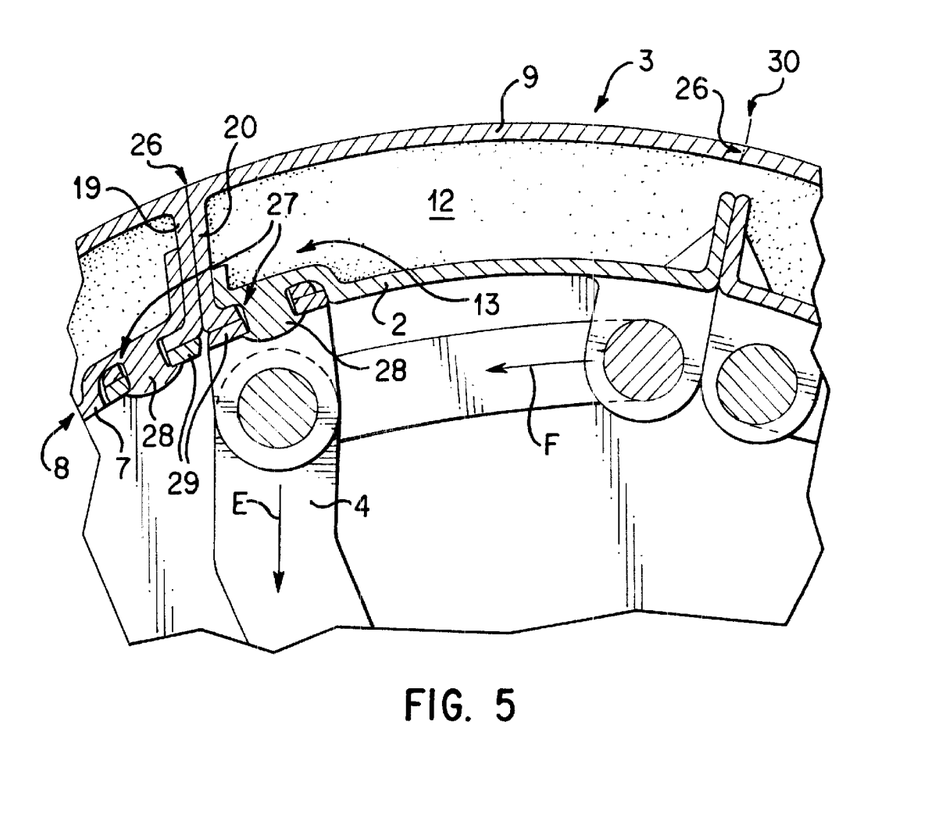
FIG. 5 is a schematic partly sectional view of the second embodiment example of a vehicle part according to the present invention.

FIG. 5 is a schematic partly sectional view of the second embodiment example of a vehicle part according to the present invention and shows the surface layer 9 with the cast skin flaps 19 and 20 built in a vehicle part 8 formed as a dashboard with an airbag lid 2. Therefore the cast skin flaps 19 and 20 are arranged in position, provided with holding holes 27 through which, for example, rivets 28 are put through. Holding rails 29 wedge in the cast skin flaps 19 and 20 between the dashboard support 7 and the lid support or the lid 2. Furthermore, FIG. 5 shows the mechanism 4 and its connection to the rest of the airbag device (not shown). The mechanism 4 performs a movement according to the arrows E and F in case of the triggering of the airbag device and thereby takes the lid 2 with it to the back from the view of a passenger sitting in front of the dashboard, who thus sees the view side of the surface layer 9 forming the dashboard. In the middle 30 at the joint of the two airbag lids 2 provided with the embodiment example shown in FIG. 5, the same technique of cutting or weakening in order to produce a weakening or thinning 26 is applied, as it was mentioned above. Cast skin flaps are not required here because this area is only subject to at least essentially tension and not "tension shearing".

The embodiment in FIG. 5 includes lids 2 made of thermoplastics. Roughly similar and at least similarly looking embodiments of different other constructions are possible, such as, for example, made of aluminium sheet.

Figure 6:
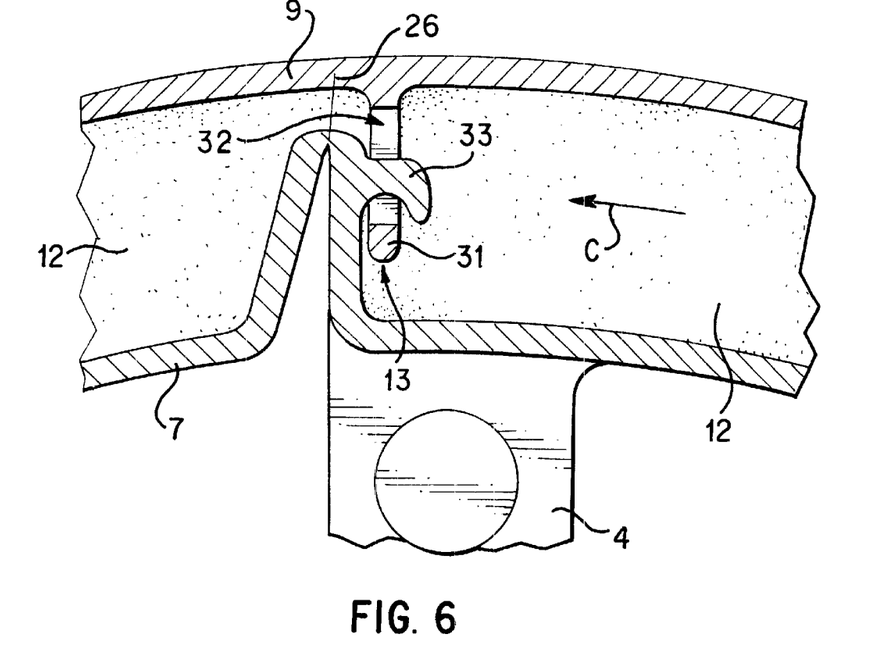
FIG. 6 illustrates a schematic partly sectional view of a fourth embodiment example of a vehicle part according to the present invention.

FIG. 6 shows a schematic partly sectional view of a fourth embodiment of a vehicle part according to the present invention. It concerns another alternative of solving the problem in the case that due to financial reasons the support 7 of the dashboard here shown as an example as vehicle part 8 and the lid 2 of the covering means 3 should be produced integrally. In this case a flap 31 of the surface layer or cast skin 9 as described above is produced. By means of punching or similar procedures the flap 31 is provided with holes 32 in such a way that they fit to hooks 33 which are arranged on the lid 2. The flow of foam according to arrow C (also compare FIG. 2) flushes the flap 31 with its holes 32 onto the hooks 33. Of course, the flaps 31 can also be hooked in a different way. Instead of the flap 31, during the process of gelling of the surface layer or cast skin, a netlike fabric material can be pressed into the latter which then also hooks onto hooks 33 (compare FIG. 2). Then the lid 2 integrally formed with the support 7 has to be pre-cut all over, as it is technically common nowadays, far example, by means of a laser. Of course, this technique is also applied it the cast skin is produced without changing temperature influence, as it is common today with different one and two-component materials.

In the following an alternative of the production of a retractable airbag lid is explained wherein a fabric as connection means is fixed to or in the cast skin of, for example, a dashboard on the one hand and to the lid of the covering means of the airbag device on the other hand. Methods of folding, the pre-damaging and the inserting are illustrated. As a further development a fabric additionally serves to avoid break-in parts of the foil weakening. As an additional means a cutting frame can be used which supports the cutting through of the surface layer formed, for example, by a foil.

Figure 7:
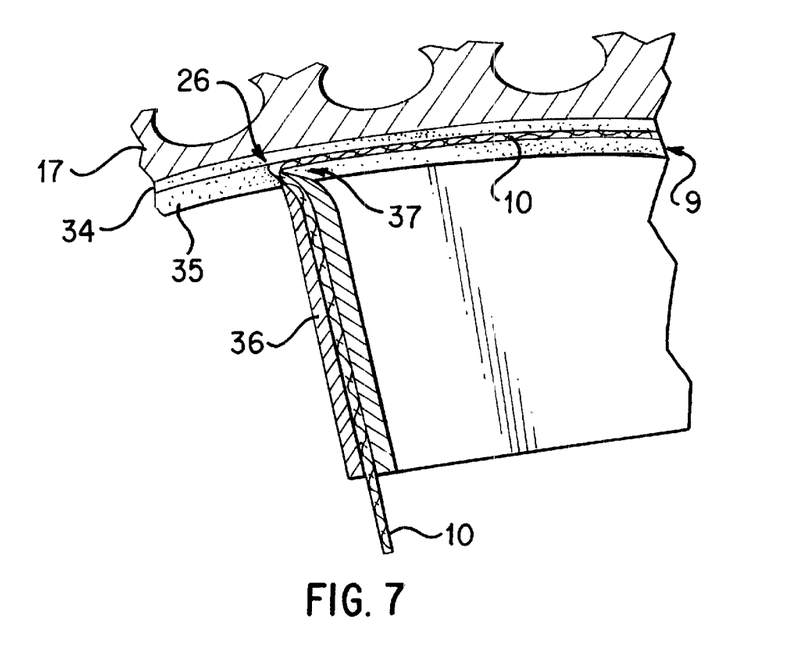
FIGS. 7, 8 and 9 show in schematic sectional views three conditions in another embodiment of a manufacturing method for a fifth embodiment example of a vehicle part according to the present invention, FIGS. 10a, b and c schematically show an embodiment example for a fabric material for the connection of the surface layer on the one hand and the covering means and the support on the other hand of a vehicle part according to the invention as perspective general view as well as of two detailed illustrations.
Figure 8:
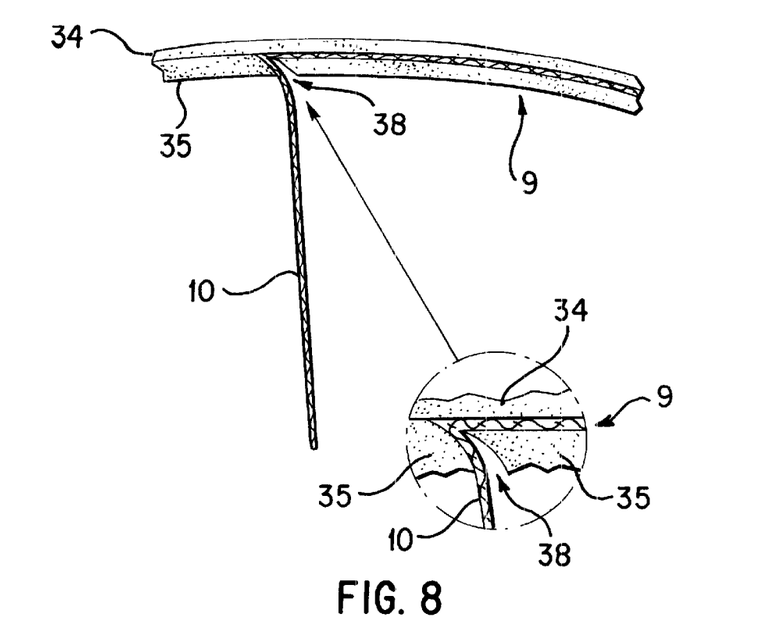
Figure 9:
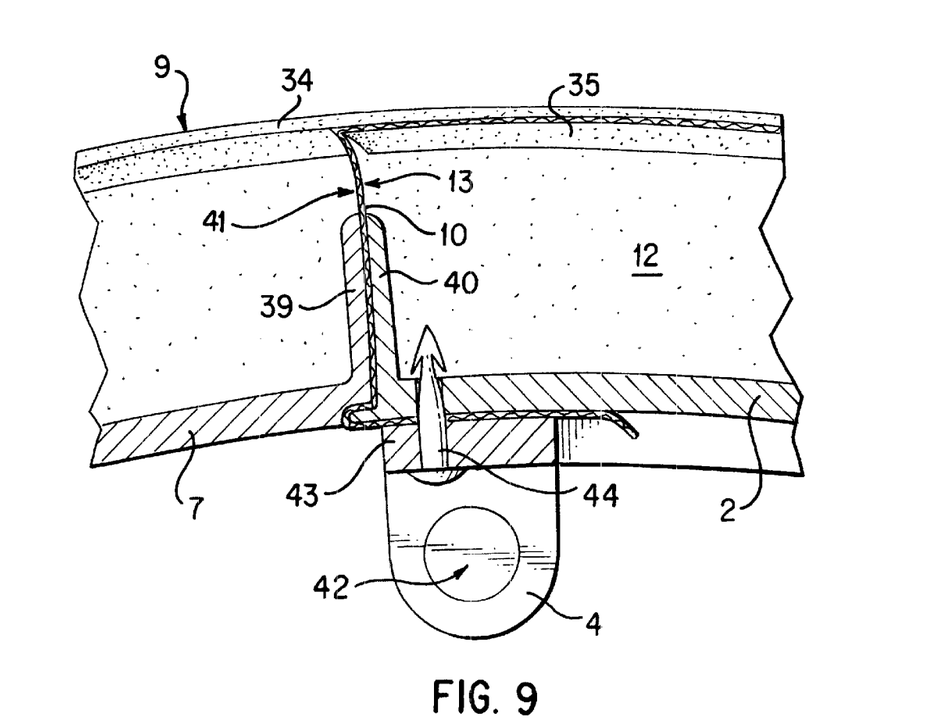

FIGS. 7, 8 and 9 illustrate in a schematic sectional view three conditions in a further embodiment of the manufacturing method for a fifth embodiment example of a vehicle part according to the present invention.

In FIG. 7 the cast skin 9, as it is increasingly common, is made of a cover layer 34 and a base layer 35. In this case a fabric 10 of sufficient tension ability is inserted during the gelling of the cover layer 34 by means of an insert tool 36. The fabric 10 being thus adhered during the hardening of the cover layer 34 in this way to the latter is then covered by the base layer 35, and the entire surface layer or cast skin, is sufficiently strengthened.

The insert tool 36 lays the fabric material 10 in a fold 37 and at the same time prevents the application of the lower layer 35 on the upper layer 34 in the later "tearing off area". The fabric 10 is laid in a fold 37 in such a way that it strengthens the surface layer or cast skin 9 in the predetermined breaking or tearing point formed in the region of the fold 37 by means of its double layer in the area of the fold 37 so that no "breaking in" of the surface layer or cast skin 9 in the weakened line for the forming of a weakening or thinning 26 occurs. The prevention of the application of the base layer 35 along the "tear off area" by means of the insert tool 36 saves the cutting of the surface layer or cast skin 9, as it is used, for example, in the embodiment examples shown in the FIGS. 3 as well as 4a and 4b, for the forming of a weakening or thinning 26.

In the embodiment example according to FIG. 7 thereby a fabric 10 is placed between the cover layer 34 and the base layer 35 of the surface layer or cast skin 9 during their process of manufacturing. The insert tool 36 inserts the fabric 10 in such a way that a fabric fold 37 is formed as a support fold which presents a strengthening of the weakening or thinning 26 which is further weakened by leaving the base layer 35 in a line shape along the edge of the lid 2 of the covering means 3 by means of the corresponding placing of the insert tool 36.

FIG. 8 shows the cast skin 9 with the fabric 10, the fabric fold 37 and the recess 38 in the base layer 35 taken out of the cast tool 17, in an illustration in an analogous size with respect to FIG. 7 and in an enlarged illustration. In FIG. 9 the assembly of the single components in the vehicle part 8, such as, for example, a dashboard, is shown. The fabric 10 is laid between the airbag lid 2 and the support of the dashboard 7, as shown in FIG. 9. Therewith the medium-sized walls 39 and 40 provide for the foam material separating the area of the support of the dashboard 7 and the airbag lid 2 for easy opening of the latter mainly in single parts. For example, a foam flow passage 41 to be determined experimentally ensures the stability of the unit composed of airbag lid 2 and support of the dashboard 7.

Fabric 10 sticking out of this assembly, for example, is adhered together with the airbag lid 2 and/or is wedged in with the mechanism 4 to be fixed to the latter, and thus forms connection means 13 between the surface layer 9 and the lid 2. For the alternative in which the tension frame in form of its tension eyes is produced in one storey with the airbag lid bottom, the fabric can mere he adhered together, welded or hooked to hooks correspondingly placed.

FIG. 9 shows the fabric 10 inserted within the cast skin 9, placed between the support of the dashboard 7 and the airbag lid 2. Two walls 39 and 40 ensure an adjusted separation of the support of the dashboard 7 and the airbag lid 2. Either the tension eyes 42 are directly connected to the airbag lid 2 or screwed, riveted or adhered (reference symbol 44) via a tension frame 43. The fabric 10 is correspondingly wedged in or adhered. For example, in a condition fixed by robots (not shown) the components 9, 7 and 2 are foamed together with each other.

Figures 10A, 10B, 10C:
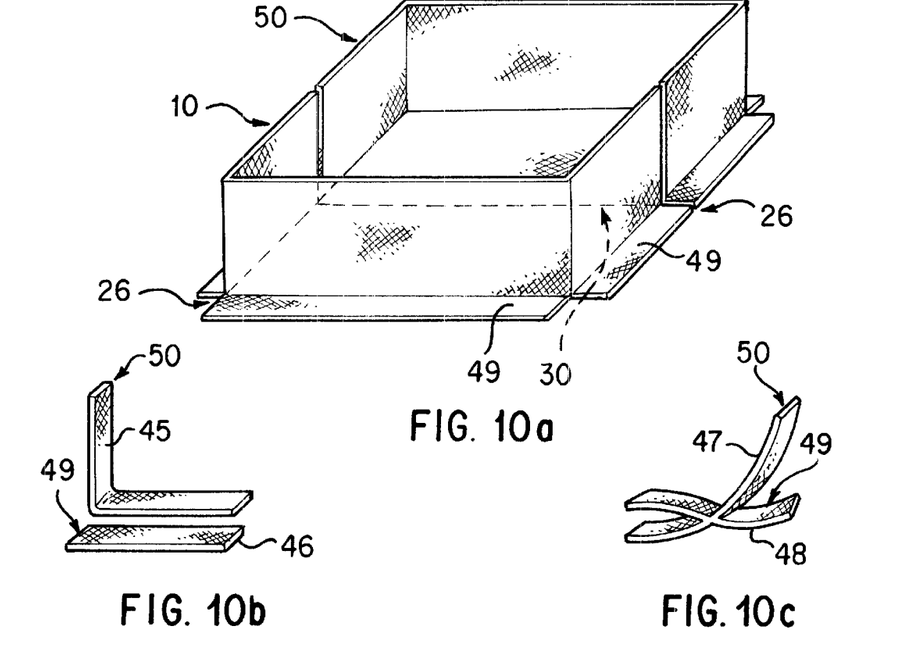

FIGS. 10a, b and c schematically illustrate an embodiment example for a fabric for the connection of the surface layer on the one hand and the covering means and the support on the other hand, of a vehicle part according to the invention as perspective general view as well as of two detailed illustrations. FIG. 10a shows a fabric 10 that is made of two fabric pieces 45 and 46 (FIG. 10b) or an integrally woven fabric 10 with two ends 47 and 48 (FIG. 10c) instead of a fold. The latter weaving is performed the same way as in the non-sewed production of airbags. In both cases of manufacturing a fabric edge 49 sticks out which is used to stabilise the breaking in of the surface layer 9 along the weakening or tearing seam 26. There the fabric 10 there is correspondingly pre-damaged for eased tearing off or is so short that it can be pulled off from the surface layer 9. The remaining fabric 10 is suitably cut or folded to be inserted into the insert tool 17. Both fabric halves are separated or correspondingly pre-damaged at the central tear off position.

FIG. 10a, illustrates the folding and cutting of the above mentioned fabric 10 alternatively in such a way that it is woven out of two fabric layers 45 and 46 (FIG. 10b) or with two open ends 47 and 48 as it is common in airbags. The short ends 49 serve when inserted for strengthening the cast skin 9 in the weakened area of the weakening 26. At the long ends 50 the airbag mechanism (not shown) engages in order to open the lids (not shown).

The fabric 10 is correspondingly separated or damaged in the centre 30 in order to be able to open the airbag lids 2. Also the enforced edge 49 is pre-damaged or short enough for the tearing off out of the surface layer or cast skin 9.

Figure 11:
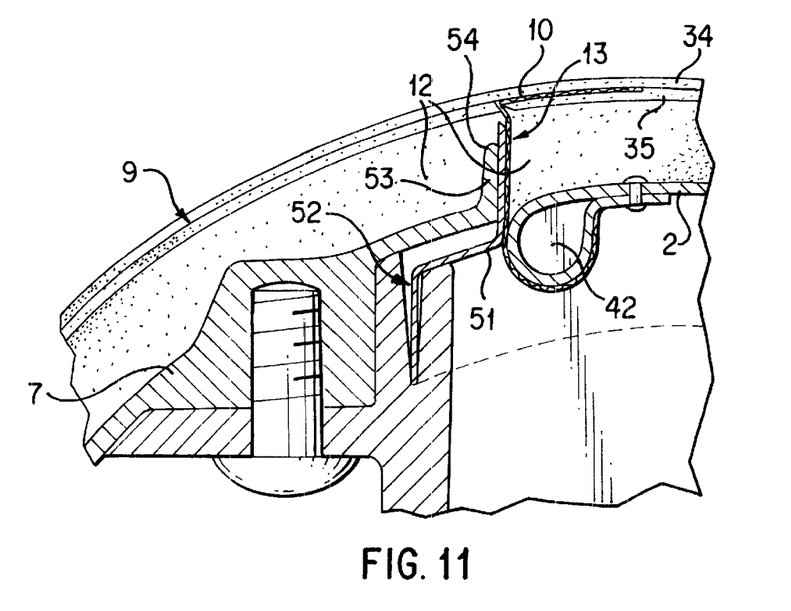
FIG. 11 shows a schematic partially sectional view of a fifth embodiment example of a Vehicle part according to the present invention.

FIG. 11 shows a schematically partly sectional illustration of a fifth embodiment example of a vehicle part according to the present invention. In FIG. 11 a section of a support of the dashboard 7 and an air bag lid 2 is shown in which additionally to the fabric connection of the surface layer or cast skin 9 a inserted as separation means 51. The foil cutting frame 51 is inserted or pressed before or after the foaming process and obtains its support by the screwing on of the air bag module (not shown). Then the cutting frame 51 is fixed all over in a corresponding slit 52 and supported. A supporting rib 53 at the support of the dashboard 7 is longitudinally adjusted in such a way that in case of a passenger's head impact a submerging of the foil cutting frame 51 behind the upper edge 54 of the supporting rib 53 is possible.

In the embodiment according to FIG. 11, a foil cutting frame 51 is provided additionally to the fabric insert 10. The foil cutting frame 51 is placed between the support of the dashboard 7 and the airbag lid 2. The foil cutting frame 51 is inserted or pressed i n before or after the foaming. After the mounting of the airbag module (not shown) the foil cutting frame 51 is all over mounted in a slit 52. The foil cutting frame 51 serves to separate the remaining surface layer 9. In case of a head impact a supporting rib 53 makes the foil cutting frame 51 submerge until it reaches the upper edge 54 of the supporting rib 53. In this case the airbag lid 2 is alternatively made of metal (e.g., aluminium), and is, with its tension eye 53 adhered together with the fabric material 10.

In the following merely for example a few preferred embodiments of the airbag device, its method of manufacturing or its deployment according to the invention are mentioned:

A movable insert in a tool can be provided for the production of a cast skin flap at a cast skin or surface layer. An insert frame can he cooled and heated and insulated for the well-aimed manufacturing of cast skin flaps. An insert can he provided with an inserted blade in such a way that it connects the cast skin between the flaps and weakens the cast skin in ease of an accident. An insert may be, for example, laser controlled in its longitudinal movement in such a way that first it is driven against the galvano dish to "zero" and then moves back laser controlled exactly the, for example, one or several tenth of a millimeter so that the durability and weakening of the cast skin are optimised. The movement can take place before, during or after the process of gelling. A blade can be provided with a notched cutting edge in such a way that when driven to "zero" against the galvano dish it perforates the cast skim that means it leaves webs between the slits. Cast skin flaps provided with holes get caught on hooks which are fixed to the support of the airbag lids. A possibility of the hooking of the cast skin flap can he realized by means of the well-aimed flow of foam. A substitute of the cast skin flap is made up of, for example, a netlike fabric which is press of gelling.

The scope of the invention is determined by the claims. Any variations, modifications and substitutions of and in the embodiment examples in the scope of what is mentioned in the claims and is part of the experts' knowledge, is encompassed by the disclosure of the present documents.

What is claimed is:

1. A combination comprising a vehicle part in the form of a support that defines a cavity for holding an airbag, an airbag mounted within the cavity defined by the support, the support defining an opening for the cavity allowing egress and deployment of the airbag, a cover that in a rest position before a deployment of said airbag is arranged essentially flush within said opening defined in said support covering said cavity, a mechanism coupled to said cover to move said cover from its rest position into a retracted position within said cavity in a direction away from a passenger upon deployment of the airbag, and a surface layer facing the passenger overlying said cover, said surface layer defining a first member fixed to said surface layer and extending toward said cover, said cover defining a second member fixed to said cover and extending toward said surface layer, said first and second members defining mutually cooperating parts for interlocking said first and second members together so that when said cover is retracted into the cavity in a direction away from a passenger upon deployment of the airbag, the cover will carry with it the interlocked surface layer.

2. The combination of claim 1 wherein the first member is a fabric embedded into the surface layer.

3. The combination of claim 1 wherein the first member is an element defining a hole.

4. The combination of claim 1 wherein the second member is a hook.

5. The combination of claim 1 wherein the second member is a hook and first member has an element that catches on the hook.

6. The combination of claim 1 wherein foam is interposed between the cover and the surface layer.

7. The combination of claim 6 wherein the foam binds to the first and second members.

8. A method comprising the steps of establishing a vehicle part in the form of a support that defines an opening and a cavity beneath the opening, covering said cavity by a cover, placing a surface layer overlying and spaced from said cover with the surface layer defining a first member fixed to said surface layer and extending toward said cover, creating on said cover a second member fixed to said cover and extending toward said surface layer, juxtaposing mutually cooperating parts defined by said first and second members for engaging and interlocking said first and second members together so that when said cover is retracted into the cavity in a direction away from a passenger upon deployment of the airbag, the cover will carry with it the interlocked surface layer, and introducing foam into the space between the surface layer and the cover to force the mutually cooperating parts of the first and second members into engagement to interlock them together.

9. The method according to claim 8 wherein the foam binds the surface layer and cover together.

10. The method according to claim 8 wherein the foam binds the mutually cooperating parts together.

11. The method according to claim 8 wherein the first member is a fabric embedded into the surface layer.

12. The method according to claim 8 wherein the first member is an element defining a hole.

13. The method according to claim 8 wherein the second member is a hook.

14. The method according to claim 8 wherein the second member is a hook and first member has an element that catches on the hook.

15. A combination comprising a vehicle part in the form of a support that defines a cavity for holding an airbag, an airbag mounted within the cavity defined by the support, the support defining an opening for the cavity allowing egress and deployment of the airbag, a cover that in a rest position before a deployment of said airbag device is arranged essentially flush within said opening defined in said support covering said cavity, a mechanism coupled to said cover to move said cover from its rest position into a retracted position within said cavity in a direction away from a passenger upon deployment of the airbag, and a cast skin facing the passenger overlying said cover, said cast skin composed of a cover layer and a base layer, an element interposed between and fixed to said cover layer and said base layer, said element having a fold along a predetermined line of said cast skin along which an adjacent recess is defined in said base layer to provide a weakening of the cast skin, the element at the fold then extending toward said cover, and being anchored to said cover so that when said cover is retracted into the cavity in a direction away from a passenger upon deployment of the airbag, the cover will carry with it the cast skin.

16. The combination according to claim 15 wherein the element is a fabric.

17. The combination according to claim 15 wherein the recess extends continuously along the predetermined line.

18. The combination according to claim 15 wherein the recess extends intermittently along the predetermined line.

19. A method comprising the steps of establishing a vehicle part in the form of a support that defines an opening and a cavity beneath the opening for holding an airbag and into which a cover can be retracted, the opening allowing egress and deployment of the airbag, positioning a cover in a rest position arranged essentially flush within said opening, creating a cast skin composed of a cover layer and a base layer overlying and spaced from said cover, interposing and fixing an element between the cover layer and the base layer, creating a fold in the element along a predetermined line of said cast skin, creating a recess adjacent the fold in the element to provide a weakening of the cast skin layer, extending the element at the fold toward said cover, and anchoring the element extended toward the cover to said cover so that when said cover is retracted into the cavity in a direction away from a passenger upon deployment of the airbag, the cover will carry with it the cast skin.

20. The method of claim 19 wherein the element is a fabric.

21. The method of claim 19 wherein the element is a foil.

* * * * *